(12) United States Patent
Adiththan et al.

(10) Patent No.: US 11,861,530 B2
(45) Date of Patent: Jan. 2, 2024

(54) SYSTEM, AND METHODS FOR IMPLEMENTING A SERVER ARCHITECTURE FOR AN ON-DEMAND AUTONOMY (ODA) SERVICE

(71) Applicant: GM GLOBAL TECHNOLOGY OPERATIONS LLC, Detroit, MI (US)

(72) Inventors: Arun Adiththan, Sterling Heights, MI (US); Ramesh Sethu, Troy, MI (US); Prakash Mohan Peranandam, Rochester Hills, MI (US); Joseph G D Ambrosio, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 17/445,121

(22) Filed: Aug. 16, 2021

(65) Prior Publication Data
US 2023/0046908 A1 Feb. 16, 2023

(51) Int. Cl.
*G06Q 10/02* (2012.01)
*G07C 5/08* (2006.01)
*G06Q 50/30* (2012.01)

(52) U.S. Cl.
CPC .............. *G06Q 10/02* (2013.01); *G06Q 50/30* (2013.01); *G07C 5/0808* (2013.01)

(58) Field of Classification Search
CPC .................................................... G06Q 10/02
See application file for complete search history.

(56) References Cited

U.S. PATENT DOCUMENTS

| | | | | |
|---|---|---|---|---|
| 10,481,600 | B2* | 11/2019 | Yen | G05D 1/0022 |
| 10,739,787 | B2* | 8/2020 | Vladimerou | G08G 1/22 |
| 11,615,651 | B2* | 3/2023 | Lian | H04L 67/145 |
| | | | | 701/31.4 |
| 2022/0139229 | A1* | 5/2022 | Hong | H04W 4/40 |
| | | | | 701/26 |
| 2023/0046908 | A1* | 2/2023 | Adiththan | G07C 5/0808 |
| 2023/0049762 | A1* | 2/2023 | Sethu | G08G 1/22 |

* cited by examiner

*Primary Examiner* — Michael A Berns
(74) *Attorney, Agent, or Firm* — Lorenz & Kopf LLP

(57) ABSTRACT

Systems and methods for a cloud-based server system configured for an On-Demand Autonomy (ODA) service are disclosed. The cloud-based server in communication with a first vehicle and a second vehicle to receive a trip request for the ODA service from the first vehicle, and seek an agreement to establish a virtual link with the first vehicle to the second vehicle by identifying one second vehicle by broadcasting the trip request to the group of second vehicles; identifying a second vehicle from submitted responses based on an application using a modeled clone with a set of functionalities to perform a matching operation between the first and second vehicles; and coordinating responses based on results of the matching operation to confirm an acceptance of the agreement; and creating a trip plan for the trip request for the ODA service based on a set of preferences received from each of the vehicles.

18 Claims, 9 Drawing Sheets

SYSTEM, AND METHODS FOR IMPLEMENTING A SERVER ARCHITECTURE FOR AN ON-DEMAND AUTONOMY (ODA) SERVICE

INTRODUCTION

The present disclosure generally relates to autonomous vehicles and more particularly relates to systems and methods for an On-Demand Autonomy (ODA) service, and more particularly relates to systems and methods of a server architecture for adaptive scheduling by an ODA cloud server of information between multiple leader vehicles (Lvs) with follower vehicles (Fvs) to fulfill various ODA service requests.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from a positioning system including global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels. An On-Demand Service provides on-demand mobility to users by providing transportation through a fleet of autonomous vehicles. Accordingly, it is desirable to provide systems and methods for an On-Demand Autonomy (ODA) service that implements a cloud-based server architecture configured with multiple control systems and with software that receives services requests from a follower vehicle, assesses the validity of the service requests, and seeks agreement from potential stakeholders (i.e., leader vehicles (Lvs) and follower vehicles (Fvs)) to determine whether to fulfill or terminate the ODA service request.

Furthermore, other desirable features and characteristics of the present invention will become apparent from the subsequent detailed description of the invention and the appended claims, taken in conjunction with the accompanying drawings and the background of the invention.

SUMMARY

A system is disclosed for an on-demand (ODA) autonomy service.

In an embodiment, a cloud-based server system configured for an On-Demand Autonomy (ODA) service is provided. The system includes a cloud-based server in communication with a first vehicle and at least one second vehicle including a scheduler to receive a trip request for the ODA service from the first vehicle, and seek an agreement to establish a virtual link with the first vehicle to the at least one second vehicle by identifying the at least one second vehicle from a group of second vehicles, wherein the scheduler is configured to: broadcast the trip request to the group of second vehicles: receiving a set of responses submitted by at least one of the second vehicles to the broadcast trip request; identify the at least one second vehicle from submitted responses from the group of second vehicles based on an application using a modeled clone with a set of functionalities to perform a matching operation between the first vehicle with the at least one second vehicle from the group of second vehicles; and coordinate one or more responses between the first and second vehicles based on results of the matching operation to confirm an acceptance of the agreement; and in response to confirmation of the acceptance of the agreement, the cloud-based server configured to create a trip plan for the trip request for the ODA service based on a set of preferences received from each of the vehicles.

In at least one embodiment, the first vehicle is a follower vehicle (Fv), and wherein the at least one second vehicle is a leader vehicle (Lv).

In at least one embodiment, the system includes the scheduler configured to: prior to performing the matching operation of the first vehicle with the at least one second vehicles from the group of second vehicles, assess the at least one second vehicles for minimum operation viability to perform the trip request based on a set of vehicle health parameters.

In at least one embodiment, the system includes the scheduler configured to perform continuous monitoring of the set of health parameters associated with each vehicle based on data transmitted back and forth between each vehicle and the cloud-based server from the start of the ODA service to completion of the ODA service, progress to completion of the trip request.

In at least one embodiment, the system includes the scheduler configured to determine a trip interrupt event in the progress to the completion of the trip request based on the continuous monitoring of the set of health parameters associated with each vehicle and modify the trip plan in response to the trip interrupt event to enable the completion of the ODA service.

In at least one embodiment, the system includes in response to a determination of the trip interrupt event, the cloud-based server configured to put forth a set of options to modify the trip request to at least the first vehicle.

In at least one embodiment, the set of options to modify the trip request to each vehicle that includes at least a modified or terminated trip plan, a change in the at least one second vehicle, a degradation of the ODA service, and the confirmation of the acceptance to the modified or terminated trip plan.

In at least one embodiment, the scheduler is configured to present a heartbeat display to each vehicle that dynamically represents real-time movement corresponding to continuously monitored data that is transmitted back and forth between each vehicle that continuously monitors the set of health parameters associated with each vehicle.

In another embodiment, a method for an On-Demand Autonomy (ODA) service is provided. The method includes receiving, by a scheduler hosted by a cloud-based server to communicate with a first vehicle and at least one second vehicle, trip request for the ODA service from the first vehicle; seeking, by the scheduler, an agreement for establishing a virtual link with the first vehicle to the at least one second vehicle by identifying the at least one second vehicle from a group of second vehicles; broadcasting, by the scheduler, the trip request to the group of second vehicles to receive a set of responses submitted by one or second vehicles to the broadcast trip request, to identify the at least one second vehicle from submitted responses from the group of second vehicles based on an application using a modeled clone with a set of functionalities, to perform a matching operation between the first vehicle with the at least one second vehicle from the group of second vehicles, and to coordinate one or more responses between the first and second vehicles based on results of the matching operation to confirm an acceptance of the agreement; and in response to confirmation of the acceptance of the agreement, creating by the scheduler, a trip plan for the trip request for the ODA service based on a set of preferences received from each of the vehicles.

In at least one embodiment, the first vehicle is a follower vehicle (Fv), and wherein the at least one second vehicle is a leader vehicle (Lv).

In at least one embodiment, the method includes before performing the matching operation of the first vehicle with at least one second vehicle from the group of second vehicles, assessing by the scheduler, the at least one second vehicle for minimum operation viability to perform the trip request based on a set of vehicle health parameters.

In at least one embodiment, the method includes performing, by the scheduler, continuous monitoring of the set of health parameters associated with each vehicle based on data transmitted back and forth between each vehicle and the cloud-based server from the start of the ODA service to completion of the ODA service, progress to the completion of the trip request.

In at least one embodiment, the method includes determining, by the scheduler, a trip interrupts event in the progress to the completion of the trip request based on the continuous monitoring of the set of health parameters associated with each vehicle and modify the trip plan in response to the trip interrupt event to enable the completion of the ODA service.

In at least one embodiment, the method includes in response to a determination of the trip interrupt event, presenting by the scheduler, a set of options for modifying the trip request to at least the first vehicle.

In at least one embodiment, the method includes the set of options to modify the trip request to each vehicle consisting of at least a modified or terminated trip plan, a change in the at least one second vehicle, a degradation of the ODA service, and the confirmation of the acceptance to the modified or terminated trip plan.

In at least one embodiment, the method includes presenting, by the scheduler, a heartbeat display to each vehicle that dynamically presents real-time movement corresponding to monitored data that is transmitted back and forth between each vehicle that continuously monitors the set of health parameters associated with each vehicle.

In yet another exemplary embodiment, an On-Demand Autonomy (ODA) server is provided. The ODA server includes a processor disposed in an ODA server in communication with a first vehicle and at least one second vehicle, configured to schedule a set of actions to receive a trip request for the ODA service from the first vehicle, and seek an agreement to establish a virtual link with the first vehicle to the at least one second vehicle based on a set of actions to identify the at least one second vehicle from a group of second vehicles, wherein the processor to perform the set of actions, configured to: broadcast the trip request to the group of second vehicles: receive a set of responses submitted by one or second vehicles to the broadcast trip request; identify the at least one second vehicle from submitted responses from the group of second vehicles based on an application using a modeled clone with a set of functionalities to perform a matching operation between the first vehicle and the at least one second vehicle from the group of second vehicles; coordinate one or more responses between the first and second vehicles based on results of the matching operation to confirm an acceptance of the agreement; and in response to confirmation of the acceptance of the agreement, create a trip plan for the trip request for the ODA service based on a set of preferences received from each of the vehicles.

In at least one embodiment, the first vehicle is a follower vehicle (Fv), and wherein the at least one second vehicle is a leader vehicle (Lv).

In at least one embodiment, the ODA server includes the processor configured to: prior to performing the matching operation of the first vehicle with one or more second vehicles from the group of second vehicles, assess the one or more second vehicles for minimum operation viability to perform the trip request based on a set of vehicle health parameters.

In at least one embodiment, the ODA server includes the processor configured to continuously monitor the set of health parameters associated with each vehicle based on data transmitted back and forth between each vehicle, from a start of the ODA service to completion of the ODA service, progress to the completion of the trip request; determine a trip interrupt event in the progress to the completion of the trip request based on continuous monitoring of the set of health parameters associated with each vehicle, and modify the trip plan in response to the trip interrupt event to enable the completion of the ODA service; and present on a heartbeat display to each vehicle that dynamically presents real-time movement corresponding to continuously monitored data that is transmitted back and forth between each vehicle that continuously monitors the set of health parameters associated with each vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
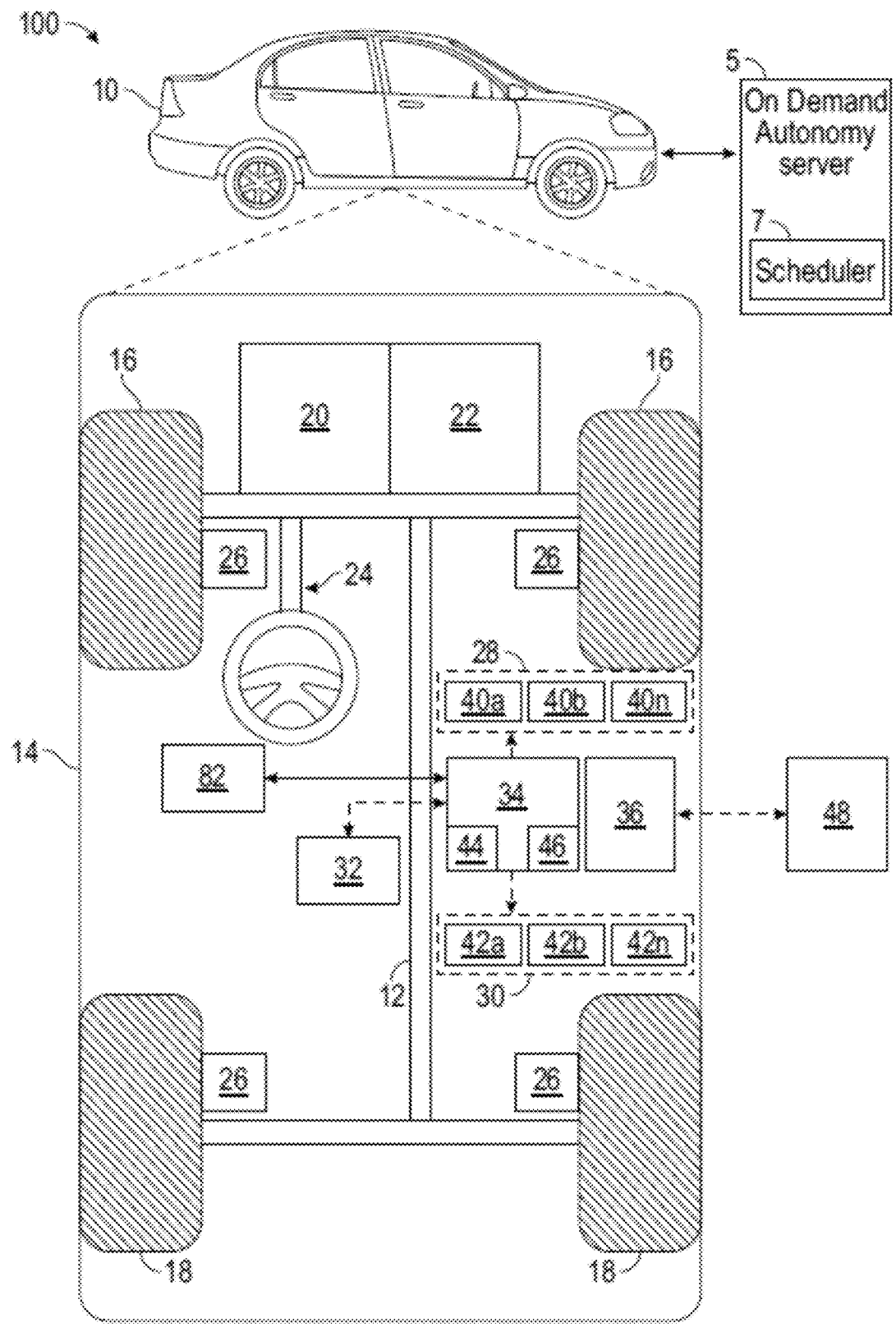
FIG. 1 is a functional block diagram illustrating an exemplary autonomous vehicle of either type of vehicle of a Leader Vehicle (Lv) or a Follower Vehicle (Fv) coupled to a cloud server for use with the On-demand Autonomy (ODA) service, in accordance with various embodiments.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term module refers to any hardware, software, firmware, electronic control component, processing logic, and/or processor device, individually or in any combination, including without limitation: application-specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various exemplary embodiments, the present disclosure provides systems and methods for an On-Demand Autonomy (ODA) service that extends a platoon and implements multiple control systems configured with the software of one or more leader vehicles (Lvs) coordinated to form virtual links using a distributed protocol with at least one subordinate or follower vehicles (Fvs) for guidance in an on-demand price model from one location to another for an on-demand service where some, most or all of either the Lvs and/or Fvs have been configured with minimum viable capabilities to request and confirm ODA service in response to communications broadcast and requests from a cloud-based ODA server.

In the various exemplary embodiments, the present disclosure describes the minimum viable capabilities of vehicles requesting the ODA service of the feature set of the capability to communicate the essential and optional parameters required for the ODA service request, to communicate vehicle health parameters and preferences (e.g., multi-stop vs trip time/distance) to a central ODA server, and processes to receive commands and appropriately activate the actuators for the required sensor and vehicle information to send to other agents for the vehicle to vehicle (V2V)/vehicle to infrastructure (V2I) connected features for communication with leader vehicle(s) and the On-Demand Autonomy Server (ODAS).

In various exemplary embodiments, the present disclosure describes systems and methods that broadcasts a valid trip request to potential leaders, receive a response from potential leaders, communicate and seek agreement from requesting followers, and identify rendezvous points for virtual coupling and decoupling with one or more leader vehicles.

In various exemplary embodiments, the present disclosure describes systems and methods for state-machine-based trip status monitoring via heartbeat messages and selecting appropriate responses including control hand-off, adaptation (new route/leader identification), and termination.

In various exemplary embodiments, the present disclosure describes systems and methods to change, reconfigure, or adapt an ODA service that is in progress between an Lv and Fv based on a request from either the Lv or Fv or monitoring of ongoing activities occurring while the ODA service is progressing. For example, after the virtual link, the health of the Lv while performing the ODA service and the virtual towing of the Fv in the vehicle platoon may require a change of the Lv or change of route because of health parameters monitored of either the Lv or Fv. In this case, the present disclosure describes systems and methods that enable the reconfiguration of the route, and the adaption by the ODA service to changed circumstances detected after commencement of the ODA service providing a basis or need to make changes from the original service request.

In various embodiments, the present disclosure describes systems and methods to implement a server-based architecture for an On-Demand Autonomy (ODA) service that extends a platoon and implements multiple control systems configured with software to provide an on-demand autonomy to vehicles that are not built for full autonomy and a feature set that enables the minimum viable capabilities of vehicles to request and implement the ODA service.

With reference to FIG. 1, FIG. 1 describes an exemplary diagram of a vehicle 10 that in an embodiment is configured as a follower vehicle (Fv) with a Level 2 plus autonomous capability or in another embodiment is configured as a leader vehicle (Lv) with a Level 3, 4 or 5 autonomous capability. Both configurations of vehicle 10 have a minimal level of communication capability to communication requests with an on-demand autonomy (ODA) system shown generally at 100 and is associated with a vehicle 10 in accordance with various embodiments. In general, the on-demand autonomy (ODA) system 100 is implemented in an on-demand autonomy (ODA) service with programmed modules and communications systems that enable one or more vehicles of either type of the follower vehicles (Fvs) or leader vehicles (Lvs)) to receive a request/respond to requests, and to compute independently based on a price metric provided by an ODA server or using a utility function in response to the request to confirm an acceptance to the request and create a virtual link between either vehicle type the Fv and Lv to construct a vehicle pool where the control of vehicle operations is relinquished by the Fv to the Lv by communication links, and control systems implemented by exemplary embodiments of the vehicle 10.

In exemplary embodiments, the ODA system 100 includes an ODA server (e.g., ODA cloud server) which is configured with a scheduler 7 for adaptive scheduling to enable coordination between multiple Lvs and an Fv to fulfill an ODA trip request. In embodiments, the scheduler 7 can include adaptive scheduling processes enabling functionalities such as receiving a trip request from one or more Fvs requesting the ODA service, broadcasting a set of requests to Lvs using the various broadcast protocol to identify one or more leader vehicles on possible routes to fulfill Fv requests, electing one or more Lvs based on availability, optimizing trip plans based on Fv and Lv preferences, identifying safe rendezvous points for seamless connection hand-off in multi-leader scenarios, monitoring the trip status via heartbeat messages originating for both the Lv and Fv and adapting/optimizing the trip plan based on monitored status updates received from either vehicle.

In an exemplary embodiment, the ODA service includes an ADS-equipped vehicle (i.e., vehicle 10) that may extend its autonomous driving capability to other vehicles on request. In an embodiment, vehicle 10 is configured to lead a non-AV vehicle with little attention from the driver of the latter from point A to point B. In another embodiment, vehicle 10 is configured to follow an AV vehicle and to relinquish driving control to the AV vehicle for a trip as directed by the ODA service.

In exemplary embodiments, the follower vehicle (Fv) may be configured with a private space for the occupants so that they can relax or attend to work. The leader vehicle (Lv) is capable of picking up and dropping the following vehicle safely at selected locations. The Fv is in constant communication with the ODA server throughout the journey including the initial phase of allocation and the final phase of dropping. The Lv can pick up one or more of the vehicles to follow to the drop-off. The Lv and Fv are configured with V2V and V2I communication capabilities.

As depicted in FIG. 1, vehicle 10 is for communication with the ODA server 7 and another vehicle type, and generally includes a chassis 12, a body 14, front wheels 16, and rear wheels 18. Body 14 is arranged on chassis 12 and substantially encloses components of vehicle 10. Body 14 and chassis 12 may jointly form a frame. The wheels 16-18 are each rotationally coupled to the chassis 12 near a respective corner of the body 14.

In various embodiments, vehicle 10 is autonomous, and the vehicle ODA system 82 is incorporated into the autonomous vehicle 10 (hereinafter referred to as the autonomous vehicle 10), and configured with different sets of modules with different programming if it is the Fv or the Lv The autonomous vehicle 10 is, for example, a vehicle that is automatically controlled to carry passengers from one location to another, or a vehicle 10 that performs a virtual tow operation of another vehicle to a location, while assuming all the control of another vehicle to the location. Vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used.

In an exemplary embodiment, the autonomous vehicle 10 is a so-called Level Two, Two plus, Three, Four, or Level Five automation system. A level Two or Two plus system indicates a system of the vehicle 10 (i.e., an Fv) that has capabilities to create and confirm a virtual link and enable another type of vehicle, the Lv to control the Fv to a requested location where the Fv has relinquished control of vehicle operation to the Lv during a planned trip. That is, for the Fv, the ODA system 82 would operate with less high-level programming to perform higher-level autonomous driving but still maintain a minimum capability (via the ODA system 82) to communicate with an ODA server 5, relinquish control to another vehicle, complete a virtual link with another vehicle, and respond to requests with another vehicle, and an ODA server 5. Level Two or Two plus (the Fv vehicle) does not have control systems and other hardware necessary to enable higher levels of automation such as that found in Level four or five systems.

The Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. Vehicle 10 would be configured with the Level 4 or 5 capabilities as the Lv and would also have the minimum communication capabilities of the Fv described above (via ODA system 82) to communicate with the ODA server 5, to form the virtual link with another vehicle, to respond to requests from the ODA server 5.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously variable transmission, or other appropriate transmissions. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences the position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
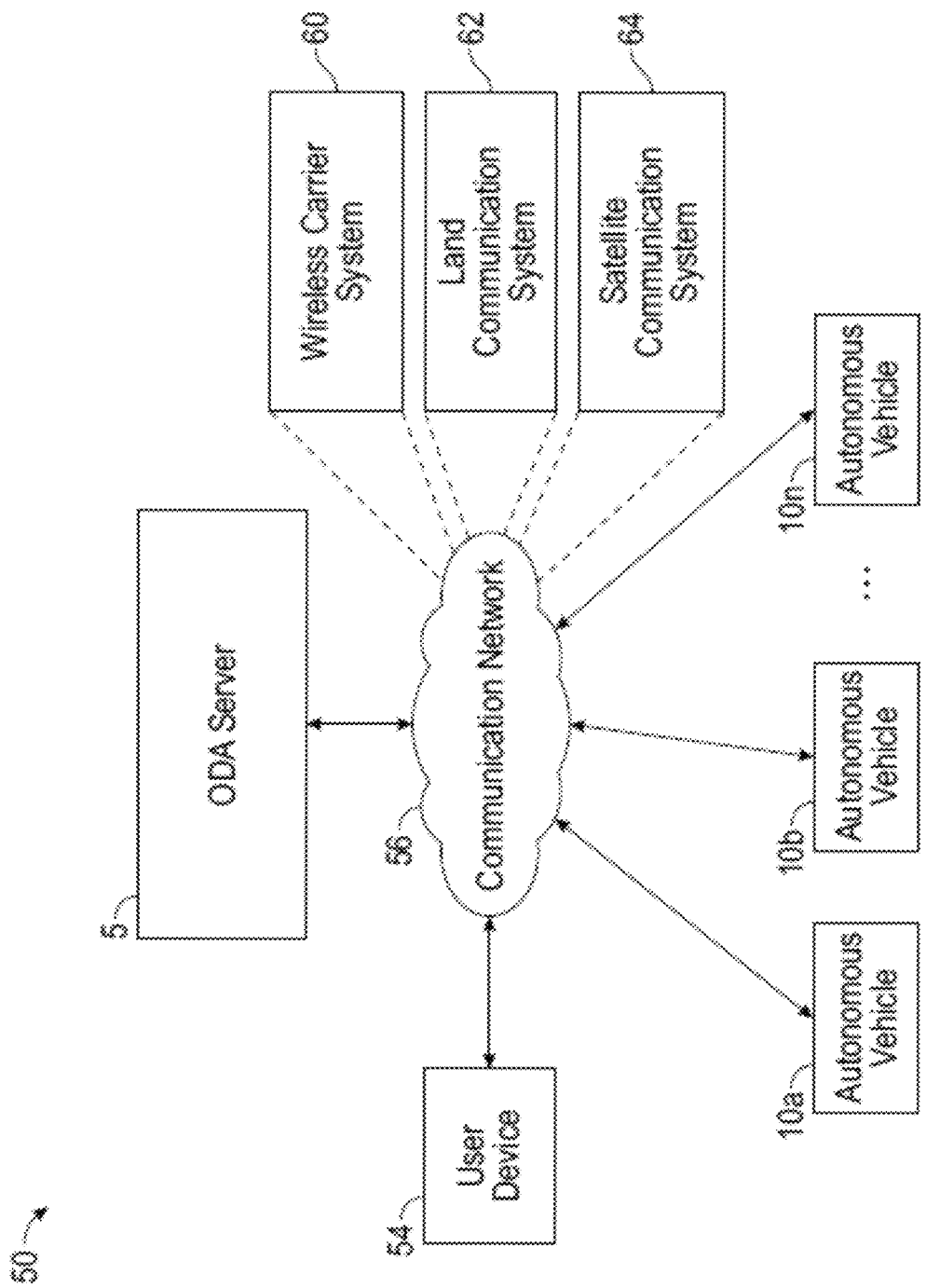
FIG. 2 is a functional block diagram illustrating an On-Demand Autonomy (ODA) Service with an ODA server coupled to one or more autonomous vehicles of FIG. 1, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of controller 34, separate from controller 34, or part of controller 34 and part of a separate system.

The controller 34 includes at least one processor 44 and a computer-readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods, and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the ODA system 100 and, when executed by the processor 44, implement the methods and systems described herein.

With reference now to FIG. 2, in various embodiments, the autonomous vehicle 10 described with regard to FIG. 1 may be suitable for use in the context of a taxi or shuttle system in a certain geographical area (e.g., a city, a school, or business campus, a shopping center, an amusement park, an event center, or the like) or may simply be managed by a remote system. For example, the autonomous vehicle 10 may be associated with an autonomous vehicle-based remote transportation system.

FIG. 2 illustrates an exemplary embodiment of an operating environment shown generally at 50 that includes an autonomous vehicle-based ODA server 5 (to perform the ODA service) that is associated with one or more autonomous vehicles 10a-10n as described with regard to FIG. 1. In various embodiments, the operating environment 50 further includes one or more user devices 54 that communicate with the autonomous vehicle 10 and/or the ODA server 5 (i.e., a cloud server) via a communication network 56.

The communication network 56 supports communication as needed between devices (i.e., Lv, Fv, and ODA server 5), systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including, for example, digital technologies such as CDMA (e.g., CDMA2000), LTE (e.g., 4G LTE or 5G LTE), GSM/GPRS, or other current or emerging wireless technologies. Other cell towers/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone networks (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62 but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smartwatch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The ODA server 5 can host an application for live advisor interaction with the Fv and Lv, or an automated advisor, or a combination of both. The ODA server 5 can communicate with the user devices 54 and the autonomous vehicles 10a-10n to schedule (via a scheduler application) rides, dispatch autonomous vehicles 10a-10n, and the like. In various embodiments, the ODA server 5 stores account information such as subscriber authentication information, vehicle identifiers, profile records, behavioral patterns, and other pertinent subscriber information.

In accordance with a typical use case workflow, a registered user of the ODA server 5 can execute applications via the scheduler to create a ride request via the user device 54. The ride request will typically indicate the passenger's desired pickup location (or current GPS location), the desired destination location (which may identify a predefined vehicle stop and/or a user-specified passenger destination), and a pickup time. The ODA server 5 receives the ride request, processes the request, and dispatches a selected one of the autonomous vehicles 10a-10n (when and if one is available) to pick up the passenger at the designated pickup location and at the appropriate time. The ODA server 5 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle-based ODA service. To this end, an autonomous vehicle and autonomous vehicle-based remote transportation system can be modified, enhanced, or otherwise supplemented to provide the additional features described in more detail below.

Figure 3:
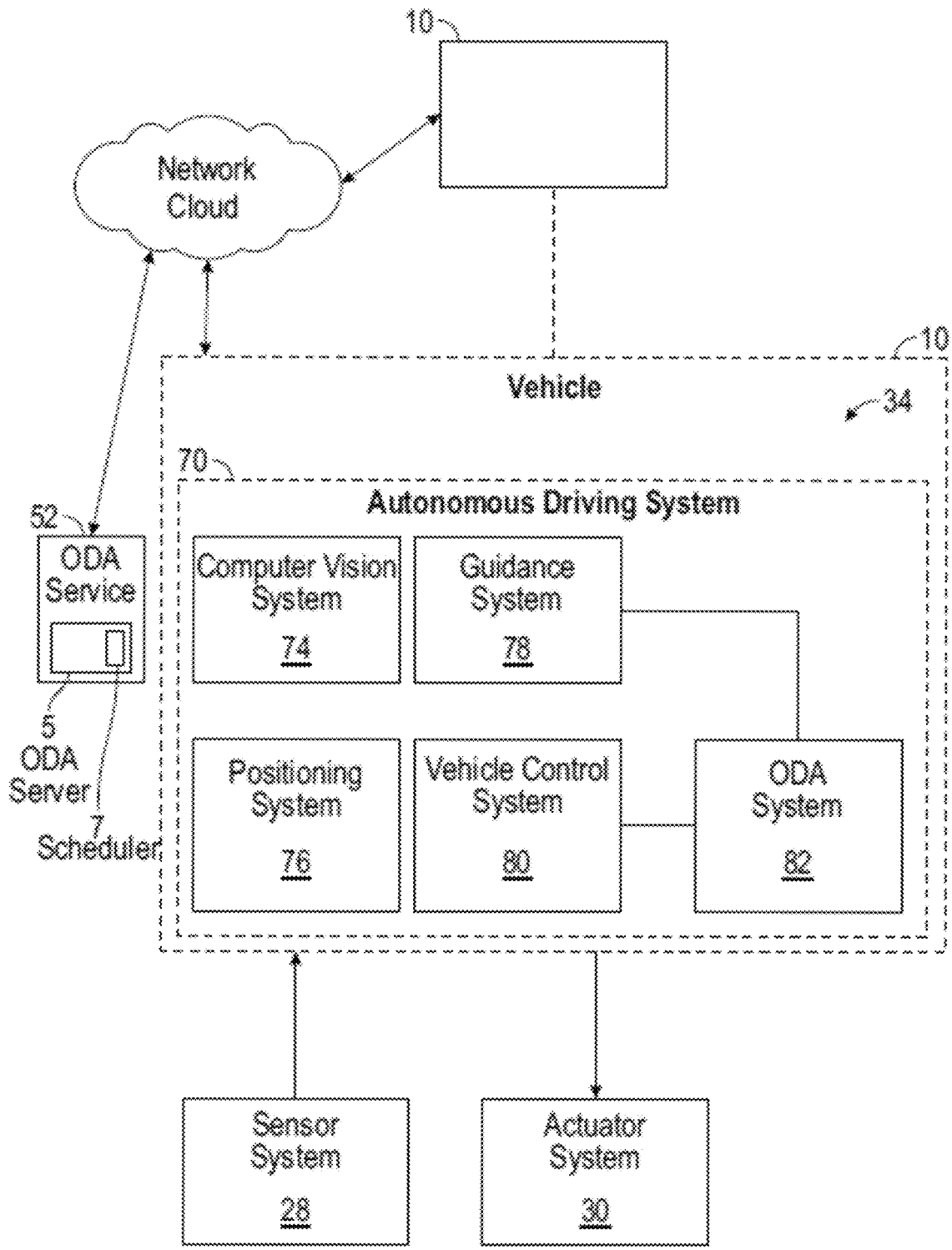
FIG. 3 is a dataflow diagram illustrating an autonomous driving system that includes the On-demand Autonomy (ODA) system of the vehicle types of Fv or Lv configured as an autonomous vehicle coupled to the ODA server, in accordance with various embodiments.

In accordance with various embodiments, controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to the lane of a road, vehicle heading, velocity, etc.) of the vehicle 10 relative to the environment. The guidance system 78 processes sensor data along with other data to determine a path for vehicle 10 to follow. For example, a path to a pick-up or drop-off location for the ODA service. The vehicle control system 80 generates control signals for controlling the vehicle 10 according to the determined path.

In various embodiments, controller 34 implements machine learning techniques to assist the functionality of controller 34, such as feature detection/classification, obstruction mitigation, route traversal, mapping, sensor integration, ground-truth determination, and the like.

As mentioned briefly above, the ODA system 100 of FIG. 1 is included within the ADS 70, for example, as the ODA system 82 that provides communication requests, for example in one embodiment of Host vehicle configured for vehicle 10 to receive requests broadcast from an on-demand autonomy server configured with the autonomous based transportation system 52. Also, in another embodiment of Robot Taxi (leader vehicle Lv) configured for vehicle 10 to accepts broadcast from an ODA server configured with the autonomous-based transportation system 52.

Figure 4:
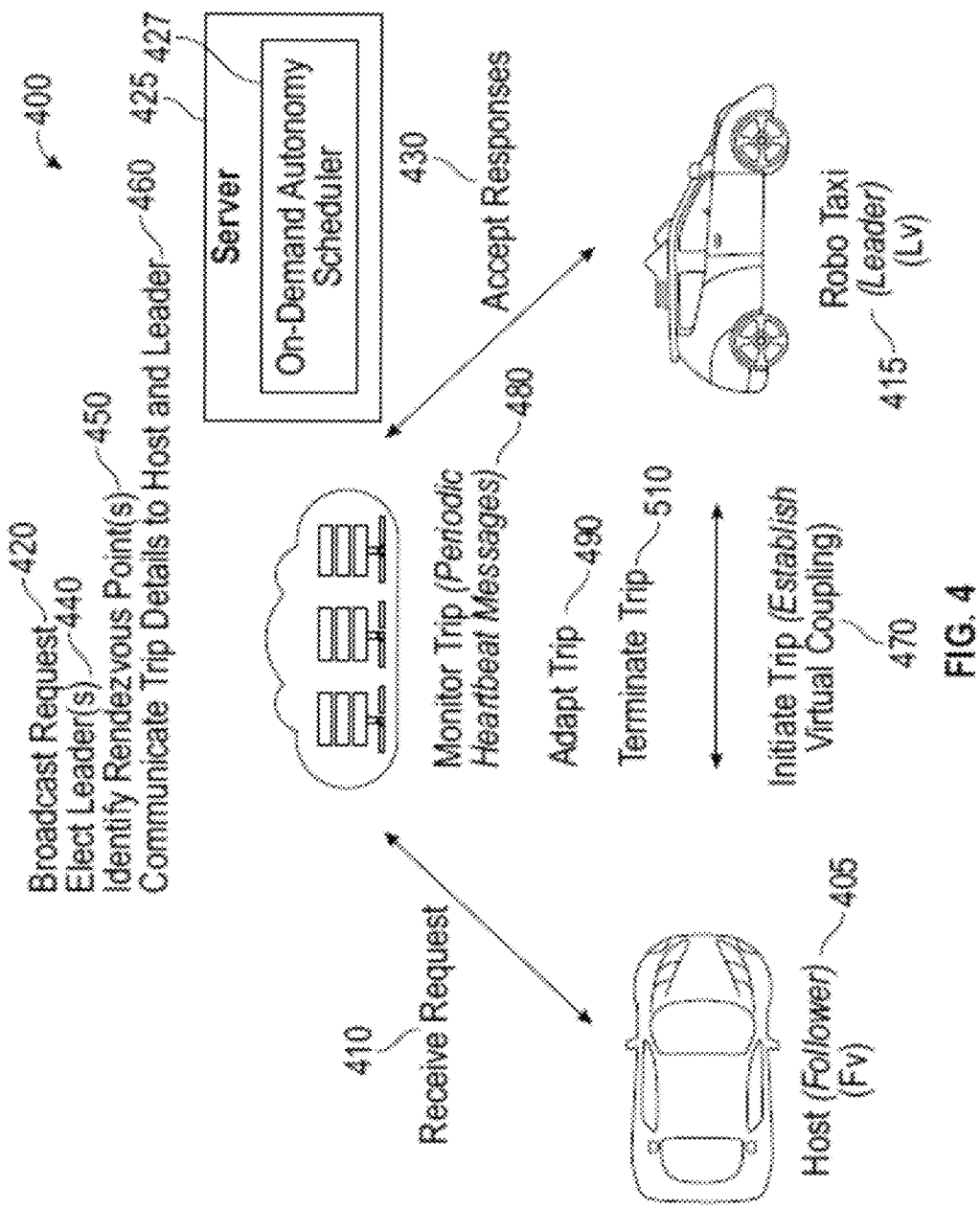
FIG. 4 is a diagram of modules and other entities and the data flow therebetween of the ODA system of the autonomous vehicle, in accordance with various embodiments.

For example, as shown in more detail with regard to FIG. 4 and with continued reference to FIG. 3, the ODA system 82 includes functionality in response to the request from an on-demand server to provide information about the vehicle 10 current status and a variety of different parameters, e.g. current location, distance, time to a location, type of vehicle, availability, ability to initiate virtual coupling, etc. for the ODA service to make the appropriate leader vehicle LV and follower vehicle FV selections.

In embodiments, the ODA system 82 includes a set of modules of a user request module, a schedule selection module, a schedule execution module, and an indication module for ODA service activities disposed of in a follower vehicle (Fv) for communicating with an ODA server by receiving requests by the user request module of information from the Fv from the ODA server, and for processing and communicating the request information to the schedule selection module; by coordinating by a schedule selection module an arrival time information with the ODA server for picking up of the Fv based on requesting information, and communicating the arrival time information to the schedule execution module; by directing by the schedule execution module for directing the Fv for picking up at a point based on the arrival time information, and for communicating the pickup point to the indication module by alerting by the indication module, by the processor, for alerting vehicles in the vicinity of picking up of the Fv via the ODA service.

In an embodiment, the user state monitoring module includes an onboard finite-state machine-based monitoring system that can detect and respond to intermittent failure conditions—switch to failsafe mode. In an embodiment, the user state monitoring module can include an observation-based new event generation mechanism for standard safety-oriented status that shall be communicated with the ODA server and vehicle leader(s).

In an embodiment, the user state monitoring module includes communication parameters required for the ODA service that include communicating minimal vehicle (Lv and Fv) health parameters (e.g., battery/oil life) and personal preferences, generating and communicating various safety events or interrupts to server and leader(s) (e.g., rear left the door open).

In an embodiment, the request elicitation module may automatically elicit responses based on various offers including offer sales, discounts, variable pricing, and flag Fvs based on multiple different criteria. The request processing module can be configured with time constraints and other constraints to make Fv offers attractive and put in time periods for acceptances and confirmations of requests.

In an embodiment, the controller 34 is configured with the ODA system 82 that includes capabilities to confirm the acceptance to the request from the ODA server 5 (for the ODA service 52) and to create a virtual link between the Lv and Fv. The ODA system may be configured with different software and functionalities for the Lv and Fv, for playing the different roles in the acceptance of the coordinated requests sent by the ODA server 5 for the ODA service 52.

In an embodiment, the ODA system 82 includes processing capabilities to independently make decisions based on price metrics and a set of weighting factors in an intelligent model as to whether to accept a request from an ODA server that has been broadcast to a number of Lvs, where the ODA server is coordinating the acceptances of multiple Lvs, and Fvs for requested location assistance and control of Fvs. The ODA system 82 includes processing capabilities to weigh multiple factors and to link and unlink an Lv in a multi-stage segmented route requested by the ODA server in response to assistance solicited for route control and navigation by an Fv. The ODA system 82 has the processing ability to participate in a vehicle platoon configured in response to responses solicited by the ODA server, where the Lv is replaced one or more times on a multi-segmented route to the requested destination as configured by the ODA server.

In an embodiment, the ODA service 52 for the ODA server 5 can consist of software programmed to enable a process that bifurcates between a set of physical entities and digital entities of the participating Lvs and Fvs. For example, the process can consist of cloning Lvs, and Fvs. As an example of the programmed process, an L clone can be defined as a Leader clone with a digital twin entity with consolidated digital information. Next, an F1 clone can be read as a Follower 1 clone with a digital twin follower and consolidated information of follower 1 where one of or more followers N can be configured. The ODA server 5 has only digital information of the entities, and the operating environment (i.e., the world), as well as the information and status on every specific service. The ODA server 5 can recalculate the optimized costs and if required reassign the Lv for an ODA service 52 requests. In this case, the ODA server 5 matches the Lv based on the operating environment and the digital information only, without any knowledge about the associated Lv or Fv.

In embodiments, the ODA system 82 may include a neural network engine that has been trained for the objects of interest to vehicles, in one embodiment, that includes trained data, trained processes in the form of computer program instructions, and a processor for executing those instructions. Such objects of interest that form part of the training of the neural network engine include locations of interest, prior virtual couplings of an Fv and Lv, prior pickups, prior information about drop-off locations that the vehicle has performed, and cost metrics and route pricing information, etc. . . . .

The exemplary embodiment of the ODA system 82 of FIG. 3 is included in the autonomous driving system 70. The autonomous driving system 70 is configured to execute steering and speed control maneuvers, amongst other possible autonomous driving possibilities, to avoid collisions and to move cooperatively with tracked objects based in part on the control commands. The autonomous driving system 70 operates known autonomous vehicle control computer instructions through a processor based in part on the control data.

FIG. 4 shows a communication network of the on-demand service 400 between the various leader and Fvs in communication with cloud OAD server to configure virtual couplings between the various leader and follower vehicles in accordance with an embodiment.

In embodiments, the on-demand autonomy (ODA) service 400 can configure a platoon to consist of one Lv configured to guide one or more FVs from one point to another in the ODA service.

In embodiments, the On-Demand Autonomy (ODA) service 400 implements one or more electronic control systems and software, built on top of a platooning service that accepts requests from other vehicles via an ODA server (ODAS), selects one or more FVs, selects one or more FVs up at pre-decided points, commands the FVs to follow a selected one of multiple LVs in a vehicle platoon for navigation, guidance, and instruction for dropping off of one or more of the FVs at various designated points.

In embodiments, the On-Demand Autonomy (ODA) service 400 provides one or more LVs serving or instructing one or more FVs configured with enhanced overheads like increased time and resources but compensated for based on a price metric generated by the ODA service using a cost-benefit (investment) model via an intelligent algorithm based on multiple weighted factors including for the more responsibilities and increases in equipment to provide increased revenue to the selected Lv.

In embodiments, the ODA service 400 enables one or more LVs to receive a request and to compute or assess independently using a utility function or model in response to the request and information provided to properly fulfill or meet the request. The Lv may determine whether to confirm the acceptance of the request using an intelligent model-based upon different parameters, e.g., route of the requests, weather, lighting, revenue, etc. and to make a selection that maximizes the parameters made available of the utility function in offering the on-demand service.

In embodiments, the On-Demand Autonomy (ODA) service 400 implements one or more electronic control systems and software, built on top of a platooning service that accepts requests from other vehicles via an ODA server (ODAS), selects one or more Fvs, selects one or more Fvs for pickup at pre-decided points, commands the Fvs to follow a selected one of multiple Lvs in a vehicle platoon for navigation, guidance, and instruction for dropping off of one or more of the Fvs at various designated points.

In embodiments, the ODA service 400 can be modified, after commencement, and the ODA server to automatically detect events or changes in parameters corresponding to the health of the Lv or the health of the Fv that require appropriate scheduling changes or modifications to the original request or ODA service in progress.

In embodiments, the ODA service 400 implements one or more LVs serving or instructing one or more FVs configured with enhanced overheads like increased time and resources but compensated for based on a price metric generated by the ODA service using a cost-benefit (investment) model via an intelligent algorithm based on multiple weighted factors including for the more responsibilities and increases in equipment to provide increased revenue to the selected Lv.

In embodiments, the ODA service 400 enables one or more Lvs to receive a request and to compute or assess independently using a utility function or model in response to the request and information provided to properly fulfill or meet the request. The Lv may determine whether to confirm the acceptance of the request using an intelligent model-based upon different parameters, e.g., route of the requests, weather, lighting, revenue, etc. and to make a selection that maximizes the parameters made available of the utility function in offering the on-demand service.

In embodiments, the ODA service 400 configures a platoon to consist of multiple Lvs configures amongst multiple segments of a route from with one or more Fvs about each route segment that makes up the route from one point to another point in the on-demand service.

In various embodiments, the on-demand autonomy (ODA) service 400 can put forth a pricing model for a configured vehicle platoon that is made up of multiple route segments where each route segment can include differently created virtual links between different Lvs and an Fv.

In embodiments, the ODA server (ODAS) 425 can be configured to enable multiple Lvs to accept requests coordinated by the ODA server with the Fv to create multiple virtual links between multiple sets of Lvs and Fvs to make up the route from one point to another in the on-demand service.

In FIG. 4, the ODA system 100 includes functionality to communicate with the on-demand autonomy (ODA) service 400 between a host (e.g., service requestor or Fv) 405, an on-demand autonomy server 425, and Robo taxi (e.g., leader or Lv) 415. The ODA service 400 includes the functionality of receiving requests 410 that are transmitted between the on-demand autonomy server (ODAS) 425 and the host 405, and accepted responses 430 that are transmitted between the on-demand autonomy server 425 and the Robo taxi 415 to initiate a trip (or virtual coupling between the Lv and Fv) 470.

In an exemplary embodiment, the ODA server 425 is configured with a scheduler 427 that receives a set of responses submitted by a group of Lv vehicles to a broadcast trip request from the ODA server 425. The scheduler 427 identifies an Lv from the submitted responses from the group of Lvs who have sent responses based on an application process that uses a modeled clone (described in further detail in FIG. 6) of a configured Lv with a set of functions suitable for the environment (i.e., world) of a locality of the Fv and the route or trip requested and planned for the Fv.

The scheduler 427 in combination with processes of an adapt trip application 490 enables the modification of the trip request based on monitored events that include trip interruptions and other events that cause the ODA service to change or to terminate unexpectedly.

In various embodiments, the scheduler 427 includes intelligent algorithms to coordinate one or more responses between the vehicles based on results of the matching operation to confirm an acceptance of the agreement between the Fv and the Lv. Prior to performing the matching operation of the Lv with the Fv, a monitoring application 480 configured with the ODA server 425 (or integrated with the scheduler 427) assesses Lv (and also the Fv) for minimum operation viability to perform a requested trip and a planned trip route. The assessment by the monitoring application 480 can be based on a set of vehicle health parameters The ODA server 425 is also configured with the monitoring application 480 to monitor the trip progression and to provide data to generate periodic heartbeat messages or heartbeat type display that corresponds to the health of both vehicles based on a set of health parameters monitored in the ongoing trip of the Fv and Lv.

In an embodiment, the monitoring application 480 can be configured to present to either vehicle, a set of options to modify the trip request or planned trip. For example, the options can include a modified or terminated trip plan, a change of the Lv and a location to meet and make the change, a degradation of the ODA service, and a confirmation of the acceptance to the modified or changed agreement terms. For example, a change of terms of the agreement can include early termination of a trip, and the cost to be charged for the early termination.

In embodiments, the ODA server 425 is configured with applications that enable the creation of a trip plan for a trip request based on a set of preferences communicated by either or both the Fv and Lv.

In embodiments, the ODA server 425 performs ODA service 400 functionalities to initiate the trip 470 and cause the virtual coupling between the Lv and Fv by initially broadcasting a request 420 for acceptance by a Robo taxi 415 whereupon the broadcast request 420 is accepted by an affirmation or an accept response 430 by a Robo taxi 415 or in an exemplary embodiment, by multiple Robo taxis (not shown).

In an exemplary embodiment, the ODAS 425 may automatically put forth a notification to a driver or an Fv to initiate a request 420 for a trip 470 based on input data from the Fv including poor driving, difficult driving conditions based on weather reports, etc. In an exemplary embodiment, the ODAS 425 may promote various pricing for the Fv to initiate the request 420 to create a virtual link with the Lv.

The ODA server 425 using a decision-making intelligent algorithm elects a leader 440 which consists of one or more Robo Taxi(s) 415. In other words, based on multiple inputs that include the current state of the vehicle, route of the vehicle, weather, passenger preference, follower pick-up/drop-off locations, and past history, etc. the elected leader or leaders 440 are both identified and selected. The ODA server 425 identifies a rendezvous 450 and communicates trip details 460 to the host and leader to execute an on-demand action.

In an exemplary embodiment, the Fv may request assistance to a location without actually having to perform driver operation. For example, the Fv may be configured with Level 2 plus capabilities that provide limited autonomous vehicle operations yet have communication capabilities to make requests for an on-demand service, enable a virtual link with the Lv where the Lv can be given sufficient operational control to virtual link and virtually tow the Fv to the desired location without the driver of the Fv actually having to operate the Fv.

In an exemplary embodiment, the ODA service 400 can transport the Fv in a platoon configuration with the Lv for enabling an autonomous driving experience (i.e., a level 4 or 5 autonomous driving experience) without the Fv actually being configured or having level 4 or 5 autonomous driving capabilities. That is, by creating a virtual link between the Lv and Fv, the Fv can operate in a semi or nearly autonomous manner by reliance on the control operations provided by the Lv. In an embodiment, by relying on the Lv for control and navigation to the requested location, the Fv can simulate an autonomous driving experience without actually being configured with the necessary software, hardware, and control system for level 4 or 5 autonomous driving capabilities.

In an exemplary embodiment, the driver of the Fv may desire a more autonomous driving experience and is willing to relinquish vehicle control for a route segment or entire route to the Lv. In this case, the follower vehicle (Fv) may send a request 420 to an ODAS 425, the ODAS 425 would coordinate pricing and selection of an Lv using a distributed protocol to solicit requests from multiple Lvs, and to enable a virtual link between the Fv and Lv, to perform a virtual towing operation to the desired location chosen by the Fv.

In various embodiment, multiple Lvs may be coordinated by the ODAS 425 to assist the Fv where the Fv is coupled by consecutive virtual links to multiple different Lvs selected in a coordinated process (i.e., distributed protocol solicitation of requests by the ODAS 425) from a group of Lvs identified by the ODAS 425, and who independently make a decision to accept a request based on a value score that each Lv and Fv independently computes based on cost metric information provided by the ODAS 425 for the route or route segments and can enable a virtual link with the Fv in the vehicle platoon configuration as put together by the ODAS 425.

In the various exemplary embodiment, the Fv in the linking operation creating the virtual link with the Lv is given the option to accept the linking request with a value score (or price metric) for the assistance provided by one or more Lvs. In this case, the ODAS 425 coordinates a set of responses from the Fv and one or more Lvs to complete or confirm a solicitation for a virtual link to control the Fv to the requested location based on a proposed price (i.e., value score/cost metric). The proposed price may be for the entire route, or a route segment where the decision to complete or confirm the transaction (i.e., the handshake between both parties) is coordinated by the ODAS 425.

In an exemplary embodiment, the cost metric or price charge by the Lv may be computed by the Lv independently or by the ODAS 425. The price charge, as an example, can be determined using a weighting factor for parameters of a set of parameters based on empirical testing and past history of Fv and Lv operations in the ODS service. The weighting factors may allow for modeling of more accurate value scores, and for adjusting the value score to take into account revenue decreases and ride diffraction that can be applied if the Fv elects not to confirm the acceptance to the request from the ODAS 425.

In an exemplary embodiment, the ODAS 425 may put constraints such as time to accept, demand pricing to accept, or other real-time constraints to the proposed price for the assistance to be provided by the Lv to enable timely completion of the request and formation of virtual link between the Lv and Fv. In another embodiment, the Lv or a set of Lvs may respond to a request broadcasted (i.e., a broadcast of information) by the ODAS 425 based on a value score that the Lv independently computes from cost metrics that the ODAS 425 computes based on a set of weighted factors for the route and for assisting the Fv in the virtual tow operation to a destination requested.

In an embodiment, the ODAS 425, the Fv, and the Lv, each makes independent decisions using a value score that is a cost-benefit directly associated with operating factors for the Lv and Fv for the request and can use a plurality of weighted factors to determine a cost charge from the Lv and Fv perspective for the Lv to perform the navigation and the control of the Fv to the requested location. In an embodiment, a utility function is specified and executed by the ODA server 425 and cost values/metrics are sent to Lv and Fv for approval/rejection.

The ODAS 425 generated cost metrics also allow the ODAS 425 to formulate an independent initial value score for each entity, the Lv and Fv. The Lv and Fv each may subsequently be based on the cost metrics provided by the ODAS 425, Also each formulate their own value score from each entities perspective.

Next, each entity, the Lv, the Fv, and the ODA server 425 can make independent decisions. For example, using the value score that the ODAS 425 itself generated, the ODAS 425 is able to coordinate and make independent decision on which Lvs and Fvs to coordinate a matching process. At a final stage of the coordination process, a decision is reached between all 3 entities or a "meeting of the minds" that is coordinated by the ODA server 425. For example, a selection module of the Fv and the Lv is configured with an intelligent module for independently calculating and determining a value score from the Fv and Lv perspective whether to confirm the requests. In other words, the Lv, Fv, and the ODA server each are configured to determine an individual value score that is best suited for each other and may/may not be the same value score across all three entities, and negotiate in a limited time a confirmation and approval of the ODA service request. In an embodiment, the selection module of the Lv or Fv determines a value score which is personal or in either entity's perspective (the Lv or Fv) based on the broadcast information received from the ODA server that includes a cost metric of an amount provided by the ODA service for the Lv to perform the control of the Fv to the requested location or for the Fv to request the ODA service from the Lv. The value score is an independently calculated score of value based on factors associated directly with the Lv or Fv operation for the ODA service request from each entities perspective, that can include as an example, the current location, time to travel to the pick up location, opportunity costs to wait for another ODA request, etc. for one or both of the entities.

In an embodiment, the Lv may be given a window of time to respond to the request and to agree (and can use its own value score to decide). The Lv and Fv may also propose different prices based on their values and provide this information to the ODAS 425 to coordinate the match. The ODAS 425 may also proposes an iterative round of price metrics based on the new information received for the Fv or Lv, and likewise, the Fv would be given a similar type of time constraint to make a decision. Once, the handshake or agreement is made by the coordinated process via the distributed protocol implemented by an algorithm of the ODAS 425 the platoon is configured by the created virtual links to assist the Fv for the route request.

In various exemplary embodiments, the Lv may have a set of preferences, and a set of capabilities that can be provided to the ODAS 425 that can change the value score, or make the Lv, a more optimal choice to engage with the follower vehicle Fv for the route assistance and provide the virtual towing operation via the virtual link. In an exemplary embodiment, the Lv can be an advanced fully automated vehicle with Level 4 or Level 5 capabilities that can respond to the ODAS 425 in an automated manner. For example, the Lvs may be a fleet of pre-designated Robo-taxis with pre-configured capabilities to virtual link with Fvs to enable Fv with semi-autonomous or only communication capabilities for Lv autonomous control to traverse a route via a configured vehicle platoon by the ODAS 425 in an autonomous driving way.

Figure 5:
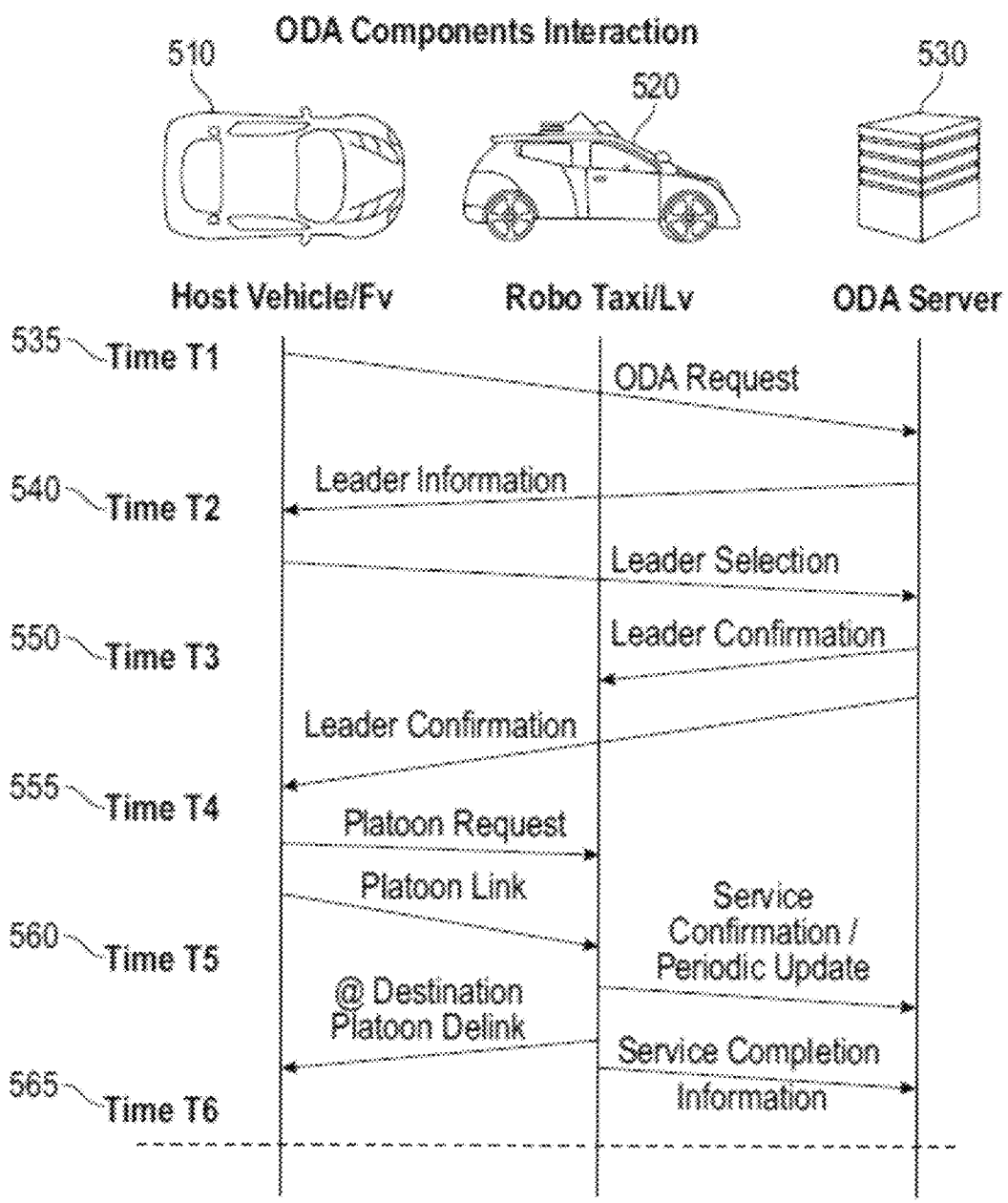
FIG. 5 is a sequence chart of requests between modules and other entities representing the data flow therebetween of the ODA system of the autonomous vehicle, in accordance with various embodiments.

FIG. 5 is an exemplary diagram of a timing chart of the interaction of the ODA server, the host vehicle or Fv, and the Robo Taxi or Lv of the ODA service in accordance with various embodiments. In FIG. 5, in an embodiment, at an initial time 535 (Time T1), the Fv 510 requests to use the ODA service for a location that is transmitted to the ODA server 530. The ODA server 530 responds to the request received by using a distributed protocol to coordinate a set of solicitations for response amongst a group of Lvs and send Lv information to the Fv 510 at a time 540 (Time T2). In response, and with confirmation of the leader selection information at a time 550 (Time T3), the ODA server 530 then or nearly simultaneously sends a confirmation of acceptance to the Fv 510 at a time 555 (Time T4). Also, at time 555, the platoon request is sent to the Lv 520 to configure the vehicle platoon via the virtual link. At time 555 (Time T5), the platoon link is received by the Lv 520 and the ODA service is confirmed, and periodic updates are also sent at time 560 (Time T5). Finally at time 565 (Time T6), upon the Fv 510 reaching the destination, the virtual link is unlinked between the Lv 520 and Fv 510, and the service completion information is transmitted to the ODA server 530.

Figure 6:
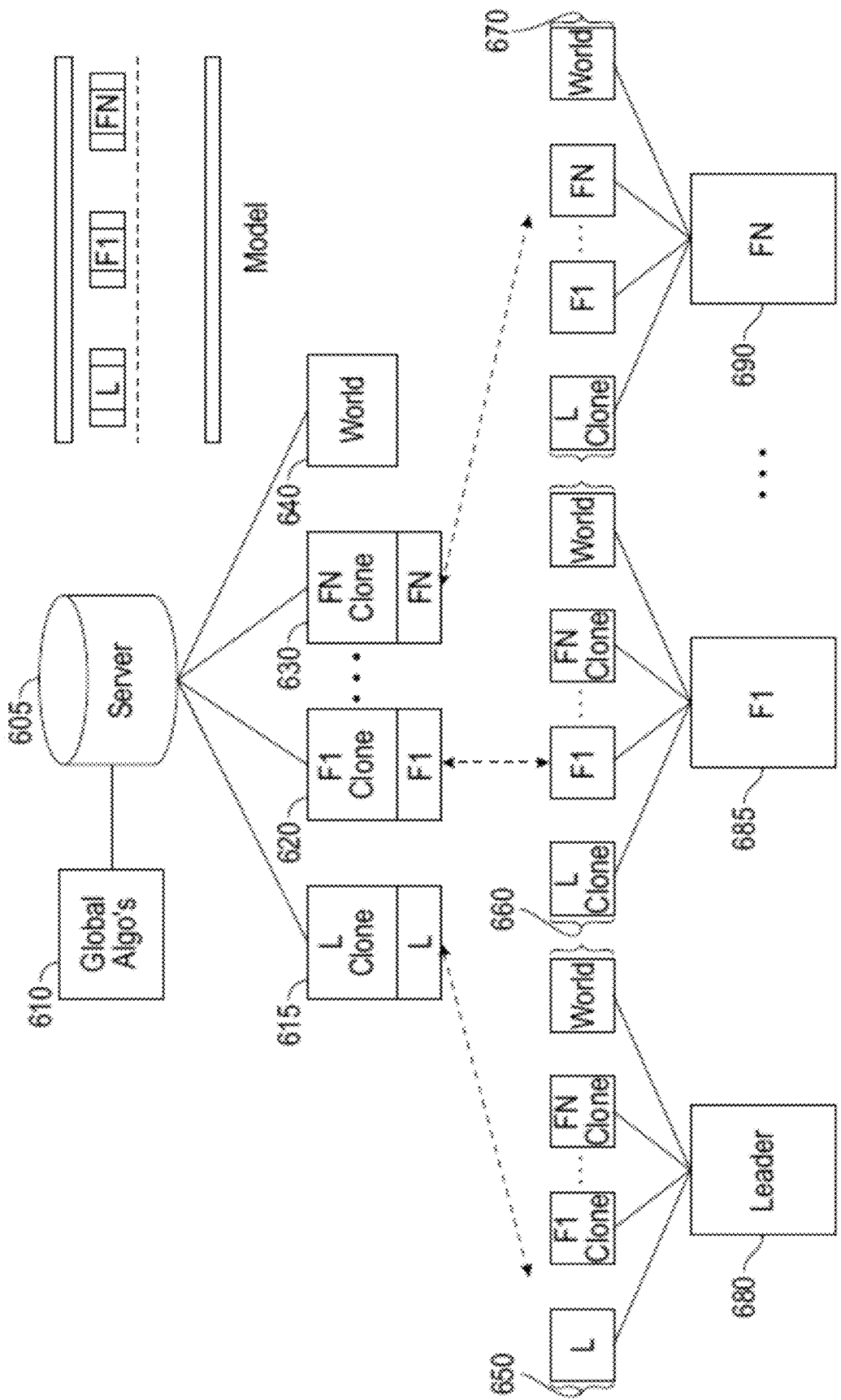
FIG. 6 is a diagram of modules and other entities and the data flow therebetween of the ODA system of the autonomous vehicle, in accordance with various embodiments.

FIG. 6 shows a diagram of the set of ODA (cloud) server 605, a set of algorithms 610 stored in an accessible data repository, and a coordinated matching process that enables a best-fit match operation of an Lv with digital information matched to a set of followers F1 to N with digital information. That is the ODA server 605 creates a set of clone Lv (virtual Lvs) 615, and sets of clone followers 620, 630, and parameters associated with the environment 640 to implement a coordinated matching process. The clone Lv combined with multiple different sets of clone functions in configured clone Lv plus followers of the set (F1 to Fn) 650, from which a leader vehicle Lv 680 is elected or identified that is compatible with the preferences of the Lv and Fv. Next, sets of clone follower sets are combined with a clone Lv and environmental factors for a combined set 660, 670 consisting of the clone Lv, followers F1 to Fn, and environmental factors to identify a list of prioritized suitable followers with F1 685 given the highest priority to Fn 690. The modeling, clone set creations, and matching process of FIG. 6 can be implemented by computer program instructions stored on a computer-readable medium executed by a processor such as at least one processor 44 (of FIG. 1). The ODA service may be carried out by the modules and sub-modules described in FIG. 6 for example and may also take in further aspects of the ODA system 82 and ODA server 5 described with respect to FIG. 3.

In an exemplary embodiment, an Lv 615 clone "L" is read at the leader clone with a digital twin of the leader clone, and consolidated information of the Leader. The follower (Fv) F1 clone 620 clones are read at the follower 1 clone and the digital twin of the follow 1 with associated digital information of the follower 1. There can be 1 or more followers and the count is referred to as "N". In an example, the leader has the completed information about itself and the lead has the digital information of the other entities (i.e., the digital twin of the follower 1 to N, and the environment (i.e., the world)) that is received through multimodal linking of communication. In the case of a follower F1, the follower F1 has the complete information of itself and the digital information of the entities (i.e., the digital twin of the Leader, other followers 2 to N, and the environment (i.e., the world)). The ODA server 605 has only the digital information of the entities and the environment (i.e., the world) as well as the status of all the specific service requests. This enables server 605 to use intelligent applications, to recalculate the costs, and if required to reassign or change leaders (Lvs) for a service request.

Figure 7B:
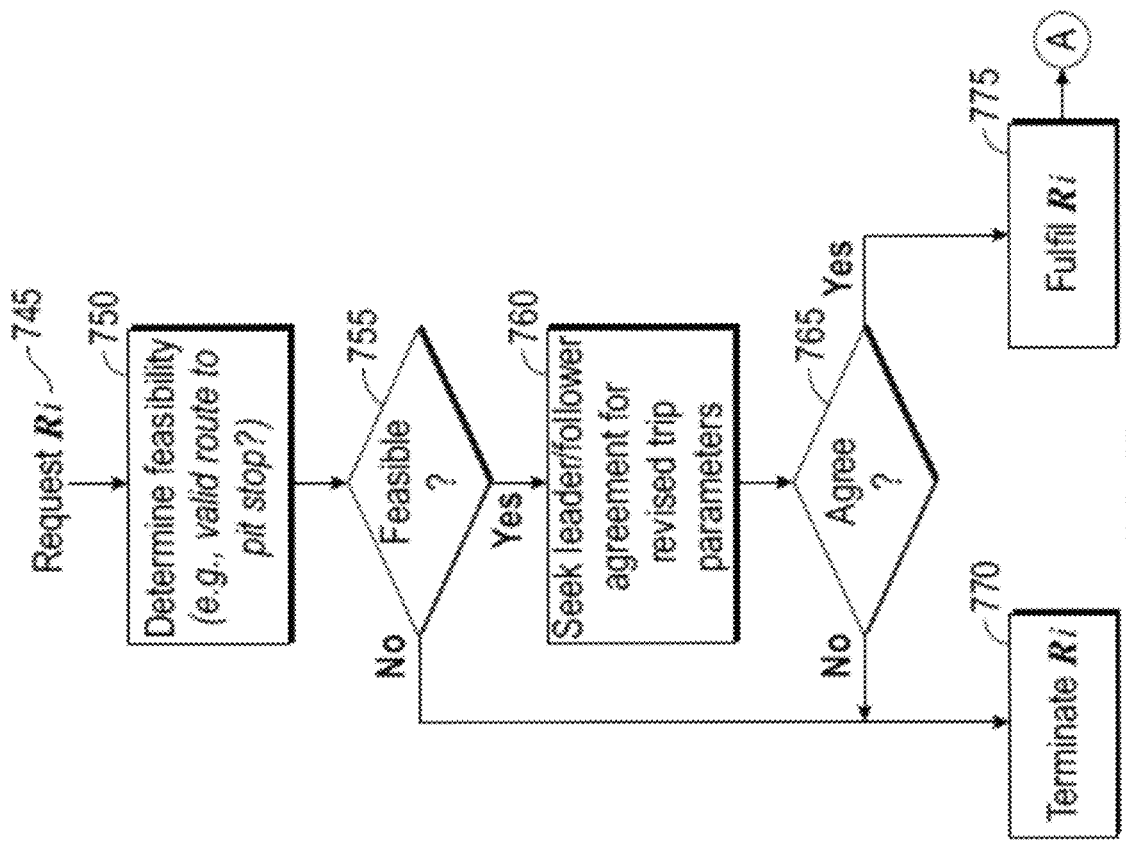
FIGS. 7A, 7B and 7C are flowcharts illustrating control methods for controlling the autonomous vehicle based on the ODA system, in accordance with various embodiments.
Figure 7A:
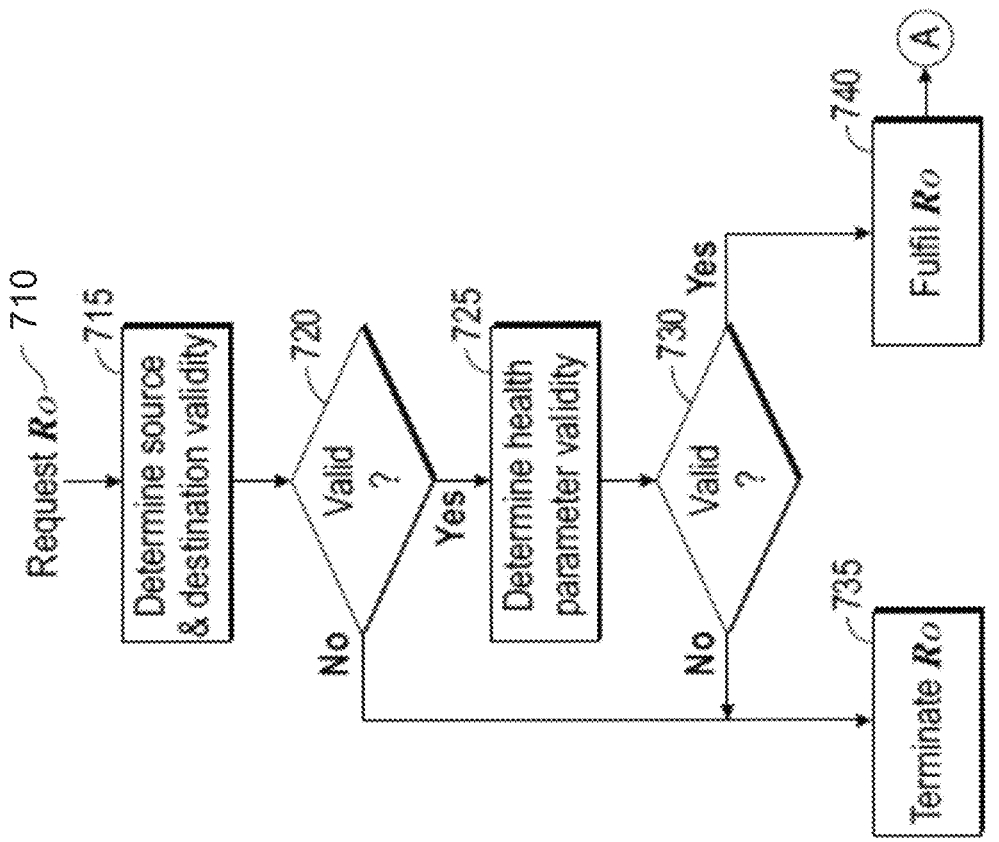
Figure 7C:
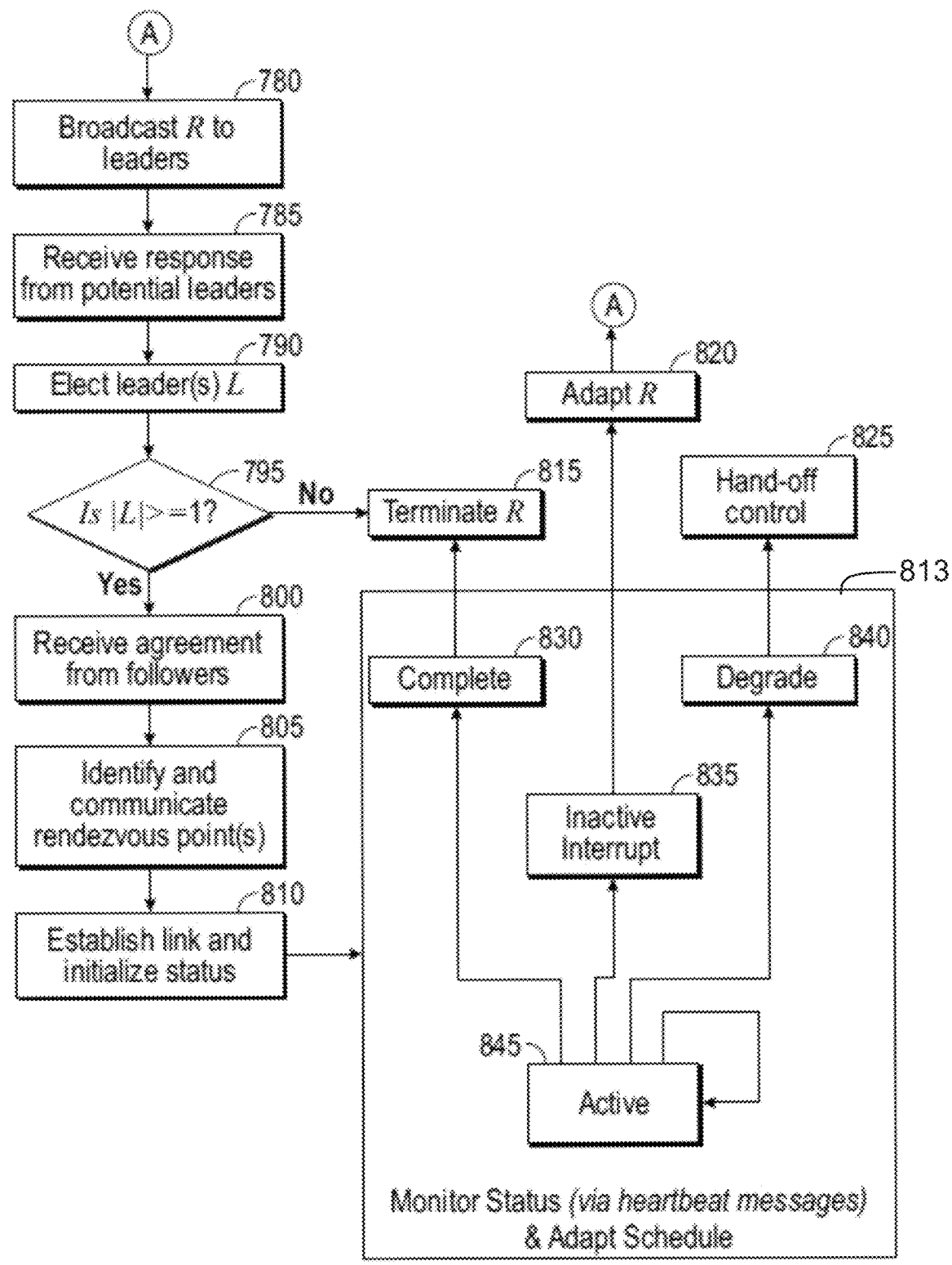

FIGS. 7A, 7B and 7C are flow diagrams of scheduling actions of the centralized scheduler (scheduler 427 of FIG. 4) for a trip request with the alternative flow because of trip interrupt requests in accordance with various embodiments. In an embodiment, an initial trip request $R_o$ at step 710 by executed by a source to a destination for an Fv and sent to the ODA server. At step 715, the source of the trip request is determined by applications of the ODA server. For example, the source may be an Fv or may be a mobile device requesting a third-party Fv. In any event, once the source is verified by an authentication process then the destination is also validated. Both the source determination and validation of destination steps ensure detection processes of legitimate trip requests and filter out fraudulent requests (i.e., pranksters, spam requests, etc.), while still maintaining an openly accessible system for on-demand autonomy requests from Fvs or other requesters that have to yet been registered in the system or been prior authenticated.

At step 720, a decision is made as to the validity of the initial trip request $R_o$ that is based at the very least on the parameters of the source request and destination request. Other parameters may include the feasibility of the route and the availability to fulfill the initial trip request, $R_o$. At step 725, the ODA server is configured to assess the Fv and also potential Fvs for minimum operation viability to perform the trip request $R_o$ based on a set of vehicle health parameters by data that is transmitted from the vehicles. At step 730, a validation of the health parameters is determined based on received data associated with the health parameter analysis from the vehicles. If the health parameters are not able to be validated, or not of a minimal level assessed for the trip request, or for that matter any of the other tests are deemed invalid including source and destination checks, then at step 735 the flow is terminated and the request of the initial trip request $R_o$ is canceled. Otherwise, if all the tests are validated including the health parameter levels checked, and the source and destination validated, then the initial trip $R_o$ is fulfilled at step 740 and continues to instigate the execution of the coordinated process to identify and elect the Lv for completion of the virtual link.

In an exemplary embodiment, in FIG. 7B, if an interrupt trip request R at step 745, the process flow differs as the initial steps are obviated and by a feasibility determination process at step 750 to determine at step 755 if the request to interrupt an ongoing or progressing trip is feasible or appropriate. For example, if the route is nearly completed or the current route because of the road conditions prevents executing the interrupt trip request R then the interrupt trip request $R_i$ would be deemed not feasible. In another example, at step 755, monitoring application of the ODA server may determine in conjunction with the original trip interrupt request R that the trip interrupts request is warranted (based on data from the monitoring health parameters indicating that one of the vehicles is not suited to continue the trip or route). If it is deemed that the trip interrupt request R is feasible, then at step 760, the scheduler or applications of the ODA server execute processes to seek either another Lv or Fv if required, to modify or revise various trip parameters such as the route, start, end, and seek confirmation and acceptance from each party (the vehicles in the platoon) of the revisions and changes suggested to the original agreement. At step 765, if either the interrupt trip request R is deemed not feasible or an agreement is not reached for revisions or changes to the original agreement then the request for a trip interrupt (i.e., the interrupt trip request R) is terminated at step 770. Alternatively, if both parties (i.e., the Fv/Lv virtually link) agree to the changes, the interrupt trip request $R_i$ is fulfilled and the changes are made to the original agreement at step 775.

In FIG. 7C, once either of the initial requests is deemed to be fulfilled, then the flow proceeds to step 780 for the continuance of the initial trip $R_o$ request (not for continuance of the interrupt request R), and the scheduler broadcasts the requests to a group of Lvs to receive a set of responses at step 785 from a set of potential Lvs. The scheduler then using the modeled clone matching process (described in FIG. 6), performs a matching operation to find the best fit Lv and to elect an Lv based in part on a set of preferences from the Fv and determinations of the route and other requirements (i.e., availability, location, etc.) at step 790. Next, at step 795, a determination is made if there is in fact an available Lv that matches or is a best to the clone and sets of functionalities that are desired. If there is no fit or Lv available, the request is terminated at step 815. Alternatively, if there is identified and elected an Lv, the flow proceeds to step 800 to make an agreement with the Fv based on terms such as the elected Lv, the price, the planned trip, the pick-up location, etc. . . . . At step 805, the identity and the rendezvous location point are communicated to the Fv and the Lv as determined by the applications of the ODA server, and at step 810 the virtual link is created for the platoon configuration of the Lv and Fv at step 813.

In another embodiment, if the interrupt request R is fulfilled then the flow continues to step 820 to adapt or change the trip plan to accommodate the interrupt request. For example, the Lv may be changed, the route to the destination may be changed, locations may be identified to hand-off in a multiple Lv configured route scenario, etc. . . . . At step 835, a notification may be presented of an inactive interrupt. In an embodiment, if the adaptation is made, and a decision to degrade (at step 840) is made, then the ODA service may be degraded and control may be handed off (at step 825) to the Fv. When control is completed at 830, then the request is terminated at step 815.

In an embodiment, during the route operation and the platooning of the Fv, the monitoring application of the ODA server continuously monitor data transmitted from the vehicles based on heart messages and adapt and optimize the trip plan based on the monitored status (i.e., the active state 845 of the vehicle). The monitor application can also present real-time heartbeat type graphical display data of the status of the vehicles based on the health and other parameters monitored that can give a visual indication of the health of the trip and the vehicles.

In an embodiment, the adapt operation at step 825 consists of the options of initiating a controlled hands-off action to the host (Fv) vehicle, identifying a new Lv of a group of available Lvs and associated rendezvous points P or a location to pull over to a safe location or point in the case of an inactive status actuated or occurring for the Fv.

Figure 8:
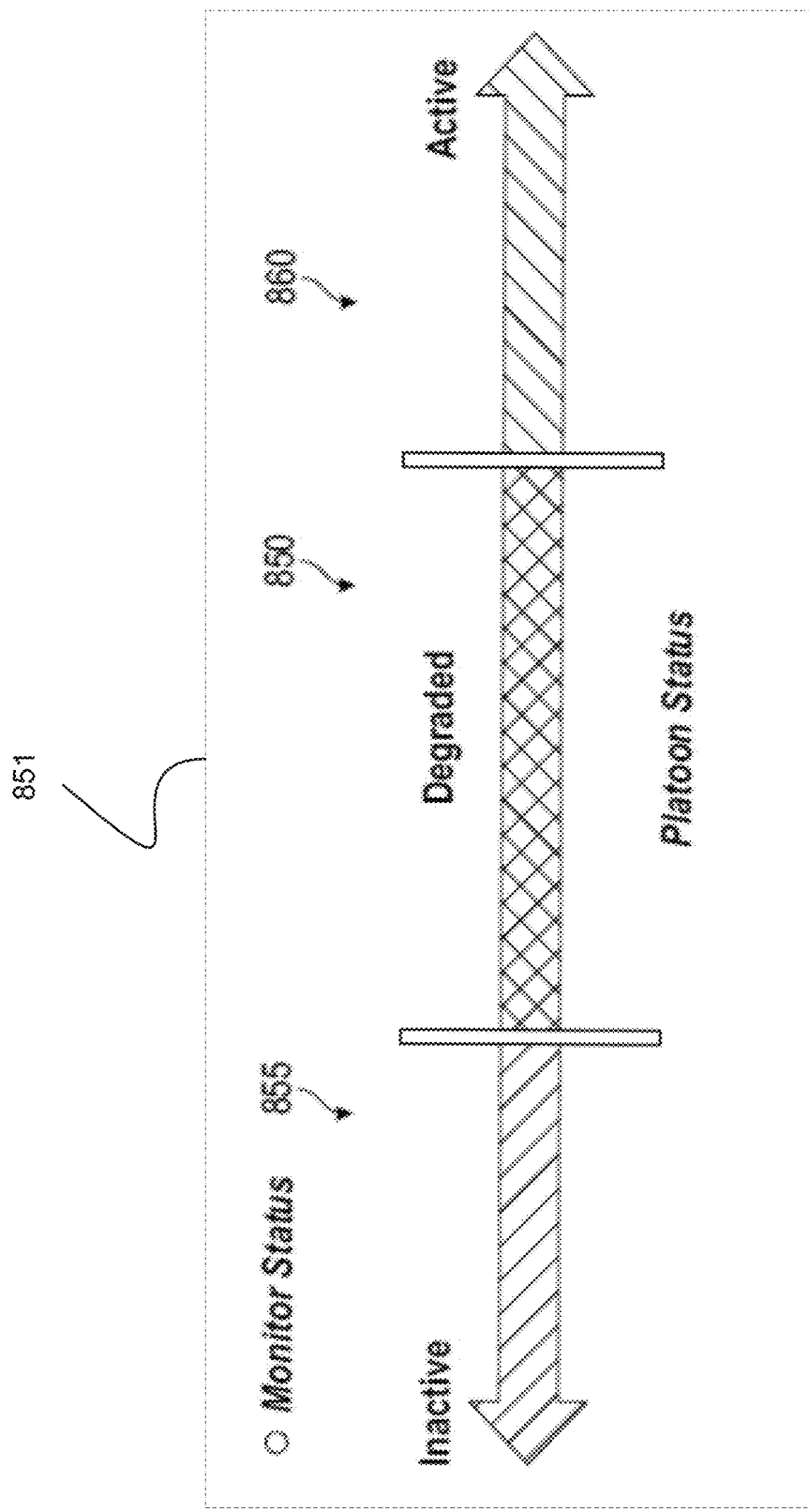
FIG. 8 is a diagram of a monitor status of states of the modules, and other entities and the data flow therebetween of the ODA system of the autonomous vehicle, in accordance with various embodiments.

FIG. 8 illustrates a diagram of a monitor display 851 that shows the platoon status of the ODA service in accordance with an embodiment. In FIG. 8, the platoon status is displayed by a monitored communication link 850 with a window that is indicative of a range of the vehicle status of being inactive 855 in the platoon, to active 860 in the platoon. Changes in the status occur when the monitored communication link fails or the FIT (host) is out of a vicinity of an Lv due to interference from non-participating vehicles.

It should be appreciated that the process of FIGS. 7A, 7B, and 7C may include any number of additional or alternative tasks, the tasks are shown in FIGS. 7A, 7B, and 7C need not be performed in the illustrated order and the process of FIGS. 7A, 7B, and 7C may be incorporated into a more comprehensive procedure or process having additional functionality not described in detail herein. Moreover, one or more of the tasks shown in FIGS. 7A, 7B, and 7C may be omitted from an embodiment of the process shown in FIGS. 7A, 7B, and 7C as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It is understood that various changes may be made in the function and arrangement of elements described in an exemplary aspect without departing from the scope of the invention as set forth in the appended claims.

What is claimed is:

1. A cloud-based server system configured for an On-Demand Autonomy (ODA) service, comprising:
a cloud-based server in communication with a first vehicle and at least one second vehicle and comprising a scheduler configured to by a processor receive a trip request for the ODA service from the first vehicle, and seek an agreement to establish a virtual link with the first vehicle to the at least one second vehicle by identifying the at least one second vehicle from a group of second vehicles, wherein the scheduler is further configured to:
broadcast the trip request to the group of second vehicles:
receive a set of responses submitted by a subset of the group of second vehicles to the broadcast trip request;
identify the at least one second vehicle from submitted responses from the subset of the group of second vehicles based on an application using a modeled clone with a set of functionalities to perform a matching operation between the first vehicle with the at least one second vehicle from the group of second vehicles; and
coordinate one or more responses between the first vehicle and the at least one second vehicle based on results of the matching operation to confirm an acceptance of the agreement;
in response to confirmation of the acceptance of the agreement, the cloud-based server configured to create a trip plan for the trip request for the ODA service based on a set of preferences received from the first vehicle and the at least one second vehicle; and
present, by a heartbeat display, to each vehicle that dynamically presents real-time movement corresponding to monitored data that is transmitted back and forth between each vehicle that continuously monitors a set of health parameters associated with each vehicle, wherein the heartbeat display comprises a window that is indicative of a range of a vehicle status being inactive in the virtual link, degraded in the virtual link, and active in the virtual link.

2. The system of claim 1, wherein the first vehicle is a follower vehicle (Fv), and wherein the at least one second vehicle is a leader vehicle (Lv).

3. The system of claim 1, further comprising:
the scheduler configured to:
prior to performing the matching operation of the first vehicle with the at least one second vehicle from the group of second vehicles, assess the at least one second vehicle for minimum operation viability to perform the trip request based on a set of vehicle health parameters.

4. The system of claim 3, further comprising:
the scheduler configured to:
perform continuous monitoring of the set of health parameters associated with each vehicle based on data transmitted back and forth between each vehicle and the cloud-based server from start of the ODA service to completion of the ODA service, and based on progress to completion of the trip request.

5. The system of claim 4, further comprising:
the scheduler configured to:
determine a trip interrupt event in the progress to the completion of the trip request based on the continuous monitoring of the set of health parameters associated with each vehicle and modify the trip plan in response to the trip interrupt event to enable the completion of the ODA service.

6. The system of claim 5, further comprising:
in response to a determination of the trip interrupt event, the cloud-based server configured to put forth a set of options to modify the trip request to at least the first vehicle.

7. The system of claim 6, wherein the set of options to modify the trip request to at least the first vehicle comprises at least a modified or terminated trip plan, a change in the at least one second vehicle, a degradation of the ODA service, and the confirmation of the acceptance to the modified or terminated trip plan.

8. A method for an On-Demand Autonomy (ODA) service, comprising:
receiving, by a scheduler hosted by a cloud-based server and configured to by a processor, communicate with a first vehicle and at least one second vehicle, a trip request for the ODA service from the first vehicle;
seeking, by the scheduler, an agreement for establishing a virtual link with the first vehicle to the at least one second vehicle by identifying the at least one second vehicle from a group of second vehicles;
broadcasting, by the scheduler, the trip request to the group of second vehicles to receive a set of responses submitted by a subset of the group of second vehicles, to identify the at least one second vehicle from submitted responses from the group of second vehicles based on an application using a modeled clone with a set of functionalities, to perform a matching operation between the first vehicle with the at least one second vehicle from the group of second vehicles, and to coordinate one or more responses between the first vehicle and the at least one second vehicle based on results of the matching operation to confirm an acceptance of the agreement;
in response to confirmation of the acceptance of the agreement, creating by the scheduler, a trip plan for the trip request for the ODA service based on a set of preferences received from the first vehicle and the at least one second vehicle, and
presenting, by the scheduler, a heartbeat display to each vehicle that dynamically presents real-time movement corresponding to monitored data that is transmitted back and forth between each vehicle that continuously monitors a set of health parameters associated with each vehicle, wherein the heartbeat display comprises a window that is indicative of a range of a vehicle status being inactive in the virtual link, degraded in the virtual link, and active in the virtual link.

9. The method of claim 8, wherein the first vehicle is a follower vehicle (Fv), and wherein the at least one second vehicle is a leader vehicle (Lv).

10. The method of claim 8, further comprising:
before performing the matching operation of the first vehicle with the at least one second vehicle, assessing by the scheduler, the at least one second vehicle for minimum operation viability to perform the trip request based on a set of vehicle health parameters.

11. The method of claim 10, further comprising:
performing, by the scheduler, continuous monitoring of the set of health parameters associated with each vehicle based on data transmitted back and forth between each vehicle and the cloud-based server from a start of the ODA service to completion of the ODA service, and based on progress to completion of the trip request.

12. The method of claim 11, further comprising:
determining, by the scheduler, a trip interrupt event in the progress to the completion of the trip request based on the continuous monitoring of the set of health parameters associated with each vehicle and modify the trip plan in response to the trip interrupt event to enable the completion of the ODA service.

13. The method of claim 12, further comprising:
in response to a determination of the trip interrupt event, presenting by the scheduler, a set of options for modifying the trip request to at least the first vehicle.

14. The method of claim 13, wherein the set of options to modify the trip request to each vehicle comprise at least a modified or terminated trip plan, a change in the at least one second vehicle, a degradation of the ODA service, and a confirmation of the acceptance to the modified or terminated trip plan.

15. An On-Demand Autonomy (ODA) server for coordinating an ODA service, comprising:
a processor disposed in an ODA server in communication with a first vehicle and at least one second vehicle, configured to schedule a set of actions to receive a trip request for the ODA service from the first vehicle, and seek an agreement to establish a virtual link with the first vehicle to the at least one second vehicle based on a set of actions to identify the at least one second vehicle from a group of second vehicles, wherein the processor is configured to:
broadcast the trip request to the group of second vehicles:
receive a set of responses submitted by a subset of the group of second vehicles;
identify the at least one second vehicle from submitted responses from the group of second vehicles based on an application using a modeled clone with a set of functionalities to perform a matching operation between the first vehicle and the at least one second vehicle from the group of second vehicles;
coordinate one or more responses between the first vehicle and the at least one second vehicle based on results of the matching operation to confirm an acceptance of the agreement;
in response to confirmation of the acceptance of the agreement, create a trip plan for the trip request for the ODA service based on a set of preferences received from the first vehicle and the at least one second vehicle; and
present, by a heartbeat display, to each vehicle that dynamically presents real-time movement corresponding to monitored data that is transmitted back and forth between each vehicle that continuously monitors a set of health parameters associated with each vehicle, wherein the heartbeat display comprises a window that is indicative of a range of a vehicle status being inactive in the virtual link, degraded in the virtual link, and active in the virtual link.

16. The ODA server of claim 15, wherein the first vehicle is a follower vehicle (Fv), and wherein the at least one second vehicle is a leader vehicle (Lv).

17. The ODA server of claim 15, further comprising:
the processor configured to:
prior to performing the matching operation of the first vehicle with the at least one second vehicle, assess the the at least one second vehicle for minimum operation viability to perform the trip request based on a set of vehicle health parameters.

18. The ODA server of claim 17, further comprising:
the processor configured to:
continuously monitor the set of health parameters associated with each vehicle based on data transmitted back and forth between each vehicle, from a start of the ODA service to completion of the ODA service, and based on progress to the completion of the trip request;
determine a trip interrupt event in the progress to the completion of the trip request based on continuous monitoring of the set of health parameters associated with each vehicle, and modify the trip plan in response to the trip interrupt event to enable completion of the ODA service; and
present on the heartbeat display the set of health parameters associated with each vehicle.

* * * * *